(12) United States Patent
Stafner

(10) Patent No.: US 6,558,294 B1
(45) Date of Patent: May 6, 2003

(54) METHOD AND APPARATUS FOR CONTROLLING AN AUTOMATIC GEARBOX

(75) Inventor: Sven Stafner, Sollentuna (SE)

(73) Assignee: Scania CV AB (Publ) (SE)

( * ) Notice: Subject to any disclaimer, the term of this patent is extended or adjusted under 35 U.S.C. 154(b) by 0 days.

(21) Appl. No.: 09/958,763
(22) PCT Filed: Apr. 13, 2000
(86) PCT No.: PCT/SE00/00702
§ 371 (c)(1),
(2), (4) Date: Oct. 15, 2001
(87) PCT Pub. No.: WO00/63591
PCT Pub. Date: Oct. 26, 2000

(30) Foreign Application Priority Data

Apr. 16, 1999 (SE) .................................. 9901349

(51) Int. Cl.$^7$ .............................................. F16H 59/48
(52) U.S. Cl. ............................ 477/120; 701/51; 701/55
(58) Field of Search ................................. 477/120, 107, 477/110, 111, 141, 900, 901; 701/51, 55, 61, 65, 66

(56) References Cited

U.S. PATENT DOCUMENTS

| 4,324,322 A | | 4/1982 | Sibeud |
| 5,083,480 A | | 1/1992 | Abo et al. |
| 5,419,128 A | * | 5/1995 | Asano et al. .................. 60/327 |
| 5,624,351 A | | 4/1997 | Fujita et al. |
| 5,672,139 A | * | 9/1997 | Horiguchi .................... 477/120 |
| 5,928,107 A | * | 7/1999 | Bieber ......................... 477/97 |

FOREIGN PATENT DOCUMENTS

SE  502550  11/1995

* cited by examiner

Primary Examiner—Richard M. Lorence
Assistant Examiner—David D. Le
(74) Attorney, Agent, or Firm—Ostrolenk, Faber, Gerb & Soffen, LLP

(57) ABSTRACT

A process and arrangement for the control of an automated gearbox upon kickdown by determining possible gear combinations for changedown, calculating the acceleration in the prevailing conditions for each gear combination and the related acceleration times. The acceleration times for the possible gear combinations are compared and a signal is emitted to the gearbox for changing to the gear combination which results in the shortest acceleration time.

10 Claims, 2 Drawing Sheets

METHOD AND APPARATUS FOR CONTROLLING AN AUTOMATIC GEARBOX

TECHNICAL FIELD

The present invention relates to a process and an arrangement for control of an automated gearbox.

STATE OF THE ART

The present invention relates to control of an automated gearbox, meaning a mechanical gearbox, which incorporates one or more constituent gearboxes, such as split, main and range gearboxes, and which is servo-assisted for the performance of gearchange movements. Such a gearbox usually forms part, together with a mechanical clutch (e.g. of plate type), of the driveline for a heavy vehicle driven by combustion engine.

"Kickdown" is conventional term for pressing the accelerator pedal down sharply to or nearly to the full extent, whereby the driver indicates a desire for rapid accleration of the vehicle. In vehicles with automatic gearboxes, kickdown also usually involves changing down so that the engine speed can be adapted to a speed range in which the torque delivered by the engine is as great as possible. To this end, the vehicle's accelerator pedal often incorporates a special sensor ("kickdown sensor") which detects its sharply depressed position. The resulting increased gas mobilization causes a momentary engine speed increase simultaneously with a changedown to cater for a temporary vehicle speed increase. According to the state of the art, kickdown involves vhanging down by one or more gears to achieve the desired increase in torque and hence increase in the speed of the vehicle.

However, a process according to the state of the art entails the risk that a less efficient changedown may be initiated, resulting in a smaller vehicle speed increase than might be achieved on the basis of the vehicle's performance.

OBJECT AND MOST IMPORTANT CHARACTERISTICS OF THE INVENTION

An object of the present invention is to indicate a development of the state of the art whereby the present problems of the state of the art are eliminated.

This object is achieved by a process and an arrangement for the control of an automated gearbox which operates by determining possible gear combinations for changedown, calculating the acceleration for each combination, and changing to the combination which results in the shortest acceleration time.

The result is the selection of a gear combination which produces for each operating situation the shortest resultant acceleration time, meaning the shortest time to achieving a desired vehicle speed increase. To this end, the relationship for each gear combination between the engine speed/vehicle speed and the maximum drive power is stored in a memory to make it possible for the accelerative drive force $F_{acc}$ to be determined for each operating point for each vehicle combination. This and other operating parameters thus provide the basis for selecting the gear combination which produces the shortest acceleration time, resulting in optimisation of the kickdown function, an optimisation which may differ markedly from the more routine changedown achieved according to the state of the art.

The calculation of the accelerative force involves deriving values from the control system with regard to the maximum engine torque for the current engine speed. This entails taking the engine's characteristics into account.

The kickdown function may be further refined according to one embodiment of the invention whereby the gearchange times for the various gear combinations are determined and preferably stored in a memory and this information is incorporated in the calculation of the shortest acceleration time. In, for example, gearboxes composed of two or more constituent gearboxes (e.g. main, split and range gearboxes), gearchange times do in fact depend entirely on whether the gearchange is to take place in only one constituent gearbox or in two or three of them. As certain gear changes can only be effected sequentially, changing gear in two or more constituent gearboxes entails a relatively long time for changing gear in the gearbox as a whole, i.e. a long period of time during which the driveline is broken.

Another embodiment of the invention involves the running resistance and/or the weight of the vehicle being calculated during its operation so that the relevant calculation data are constantly available.

The invention also relates to an arrangement for control of an automated gearbox whereby corresponding advantages are achieved as in the aforesaid process.

Further advantages will be evident from the following detailed description.

BRIEF DESCRIPTION OF THE DRAWINGS

The invention will now be described in more detail against the background of an embodiment and with reference to the attached drawings, in which.

DESCRIPTION OF AN EMBODIMENT

Figure 1:
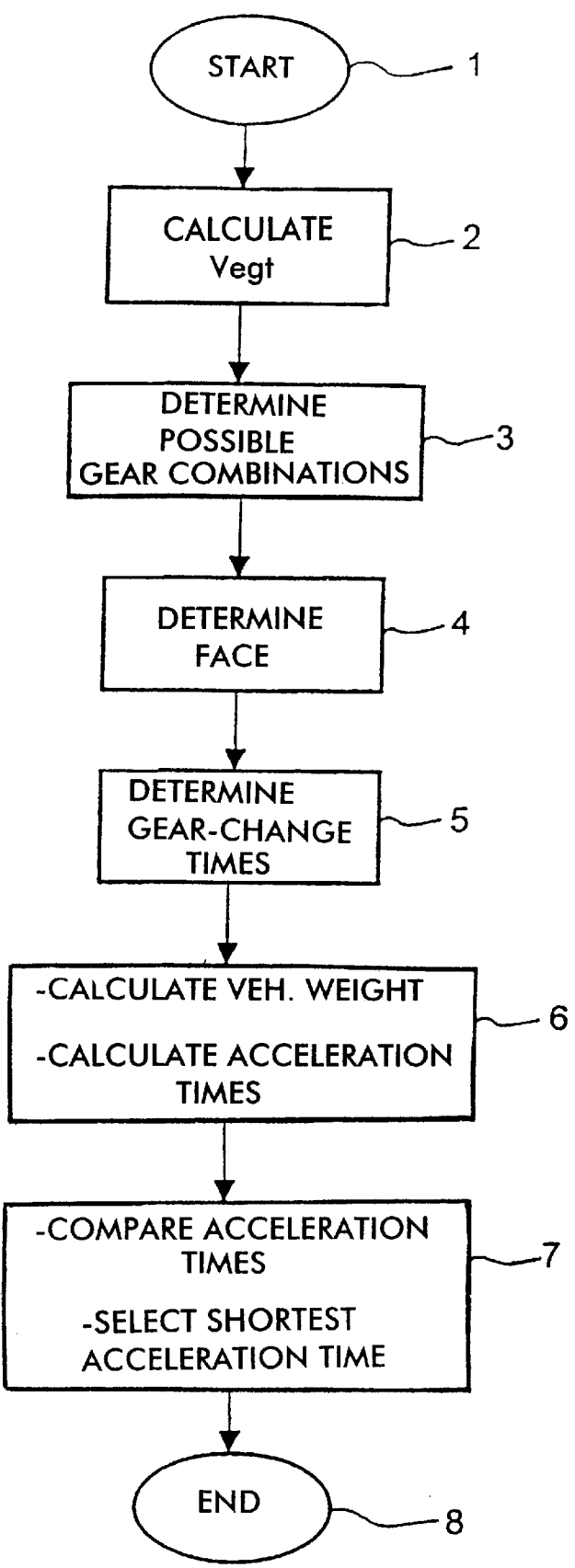
FIG. 1 shows a flow diagram of a process according to the invention.

FIG. 1 thus depicts a flow diagram of a process according to the invention, in which ref. 1 represents the beginning of the sequence, registering that the driver has effected a kickdown. Ref. 2 represents calculation of a target running speed $V_{tgt}$ based on the vehicle's speed at the time. Ref. 3 represents determination of possible and permissible gear combinations for changing down, taking inter alia into account the calculated final running speed and ensuring that the maximum values for engine speed and driveline loading are not exceeded. Ref. 4 represents determination of the accelerative force $F_{acc}$ for each possible gear combination and takes into account the calculated running resistance, which is preferably updated continuously while the vehicle is in motion. Information on running resistance and other running parameters is received by a control unit incorporated in the control system (see FIG. 2) from sensors in the driveline and from a separate memory. Ref. 5 represents determination of the gearchange time for the various gear combinations, taking into account such factors as the number of constituent gearboxes in which gear changing is to take place, whether their gear changes are to take place sequentially, and including the clutch operating time. As indicated above, what is here concerned in practice is the time during which the driveline is broken by the clutch. Ref. 6 represents the gathering of information on vehicle weight etc., information which is preferably calculated and updated continuously in a conventional manner while the vehicle is in motion. Also determined on the basis of these values are the acceleration times up to a vehicle speed increase with a defined value, $\Delta v$, for the various gear combinations. Ref. 7 represents comparison of the acceleration times obtained, selection of the gear combination with the shortest acceleration time and emission of signals to the driveline components involved in changing to the gear combination selected. Ref. 8 represents the completion of the sequence.

Figure 2:
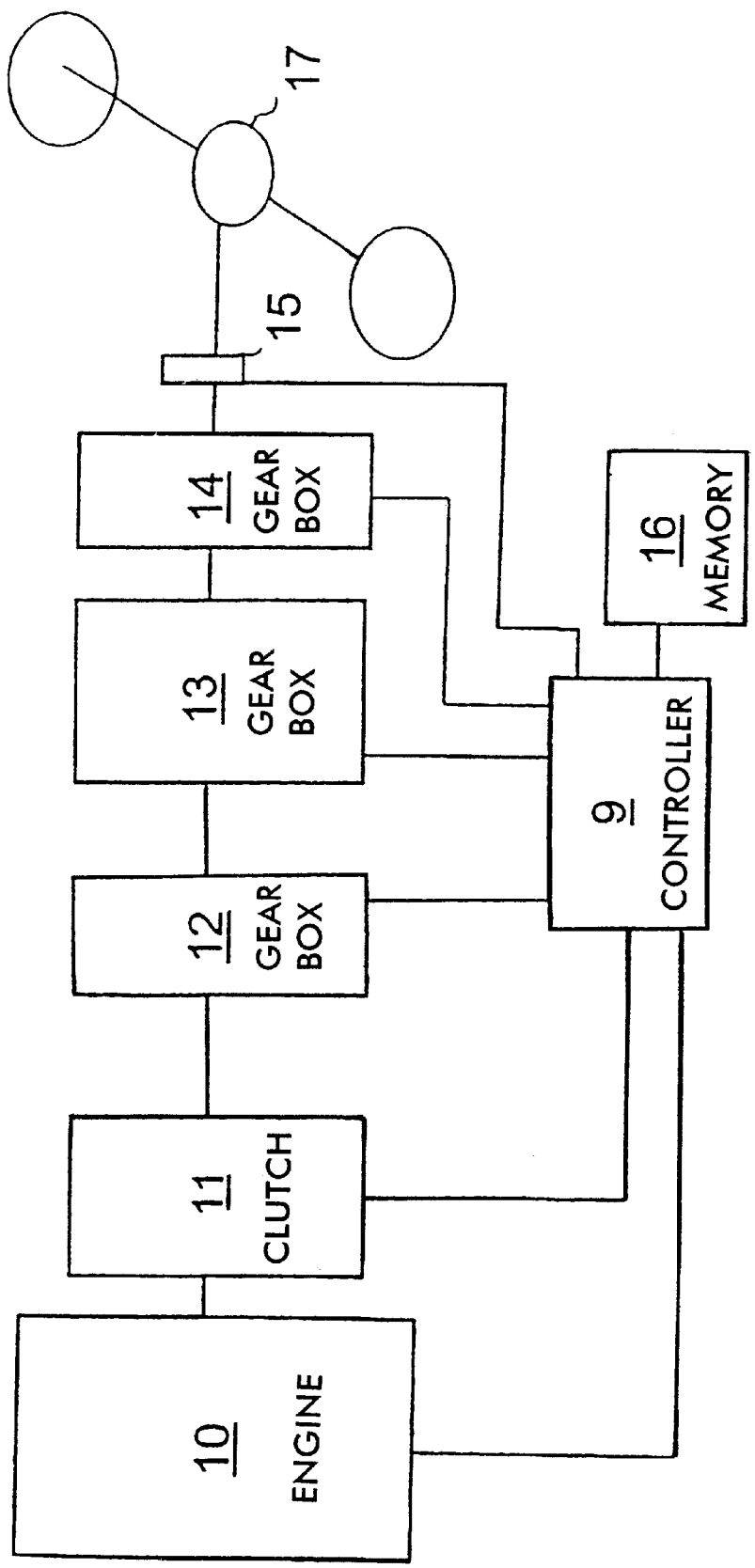
FIG. 2 illustrates schematically the control system according to the invention for a driveline for a heavy vehicle.

FIG. 2 illustrates schematically an arrangement for control according to the invention, in which ref. 9 represents a control unit which advantageously incorporates devices for control according to the invention which are integrated into or connected to the normal engine control system. Ref. 16 represents a memory for registering running parameters, vehicle weight, running resistance etc. which have to be taken into account in connection with the present invention.

In the driveline, the engine is denoted by 10, the clutch by 11 and the here triple gearbox by 12, 13 and 14, which may represent a division into split, main and range gearboxes. An output speed sensor is denoted by 15 and the final gear by 17.

Upon kickdown, the control unit 9 is designed to:

calculate a target running speed $V_{tgt}$ on the basis of the current running speed, determine possible gear combinations for changing down, determine the accelerative drive force $F_{acc}$ for each possible gear combination on the basis of the maximum drive force for the respective gear combinations, taking into account the maximum engine torque for each engine speed, and the calculated running resistance, calculate the acceleration, a, for positive $F_{acc}$ by means of an estimate of the vehicle weight, and calculate the acceleration time for a running speed increase with a specified value, $\Delta v$ control the engine speed in a manner corresponding to the calculated running speed with regard to the permissible maximum engine speed, and compare the acceleration times for the possible and permissible gear combinations and emit a signal to the gearbox for changing to the combination which results in the shortest acceleration time.

The control unit 9 is preferably also designed to:

determine the gearchange times for the various gear combinations and incorporate them in the calculation of the shortest acceleration time, calculate from the vehicle's running data the running resistance and/or the vehicle weight during operation, control the gearbox and the vehicle's transmission also with regard to permissible loading and engine speed.

The diagram shows the control unit 9 communicating with the engine, with the clutch, with the various constituent gearboxes, with the output shaft sensor 15 and with the memory 16.

The invention may be modified within the scope of the patent claims. Thus the invention is in principle applicable to a single gearbox but, as indicated above, the greatest gain is in the case of divided gearboxes where gear changing in the various boxes has to take place sequentially. In such gearboxes, the total gearchange time is of great significance for the total acceleration time. Optimising (i.e. minimising) the acceleration time results in greater driving comfort and, in many cases, safer driving, since overtaking times can be minimised.

What is claimed is:

1. A process for the control of an automated gearbox for an engine upon kickdown, the process comprising:

calculating a target running speed of a vehicle having the gearbox based on a current running speed of the vehicle;

determining possible gear combinations for changedown;

determining an accelerative drive force for each possible gear combination on the basis of a maximum drive force for each possible gear combination, a maximum engine torque at a current engine speed, and a calculated running resistance of the vehicle;

calculating acceleration for positive accelerative drive force by estimating a weight of the vehicle, and calculating acceleration times for increasing the running speed of the vehicle by a specified value for each possible gear combination;

controlling the engine speed corresponding to the target running speed based on a permissible maximum engine speed; and comparing the acceleration times for the possible gear combinations to determine a shortest acceleration time and emitting a signal to the gearbox for changing to the gear combination which results in the shortest acceleration time.

2. The process according to claim 1, further comprising calculating gearchange times for the possible gear combinations and incorporating the gearchange times in determining the shortest acceleration time.

3. The process according to claim 1, wherein the running resistance is calculated during operation of the vehicle and on the basis of running data for the vehicle.

4. The process according to claim 1, wherein the gearbox and transmission of the vehicle are controlled based on the permissible maximum engine speed and loading of the vehicle.

5. The process according to claim 1, wherein the vehicle weight is calculated during operation of the vehicle and on the basis of running data for the vehicle.

6. An arrangement for control of an automated gearbox of a vehicle upon kickdown, the arrangement comprising:

a control unit which is operable to:

calculate a target running speed of the vehicle based on a current running speed of the vehicle;

determine possible gear combinations for changedown;

determine an accelerative drive force for each possible gear combination on the basis of a maximum drive power for each possible gear combination, a maximum engine torque for a current engine speed, and a calculated running resistance of the vehicle;

calculate acceleration for positive accelerative drive force by estimating a weight of the vehicle, and calculate acceleration times for increasing the running speed of the vehicle by a specified value for each possible gear combination;

calculate the engine speed corresponding to the calculated target running speed based on a permissible maximum engine speed; and compare the acceleration times for the possible gear combinations to determine a shortest acceleration time and emit a signal to the gearbox for changing to the gear combination which results in the shortest acceleration time.

7. The arrangement according to claim 6, wherein the control unit is further operable to calculate gearchange times for the possible gear combinations and to incorporate the gearchange times in determining the shortest acceleration time.

8. The arrangement according to claim 6, wherein the running resistance is calculated on the basis of running data for the vehicle during operation.

9. The arrangement according to claim 6, wherein the control unit is further operable to control the gearbox and transmission of the vehicle based on the permissible maximum engine speed and loading of the vehicle.

10. The arrangement according to claim 6, wherein the vehicle weight is calculated on the basis of running data for the vehicle during operation.

* * * * *